United States Patent [19]

Volz

[11] 4,044,833
[45] Aug. 30, 1977

[54] ACID FOAM FRACTURING

[75] Inventor: Herbert A. Volz, Bartlesville, Okla.

[73] Assignee: Phillips Petroleum Company, Bartlesville, Okla.

[21] Appl. No.: 694,114

[22] Filed: June 8, 1976

[51] Int. Cl.² .................. E21B 43/26; E21B 43/27
[52] U.S. Cl. .................................. 166/307; 166/308
[58] Field of Search ........ 166/307, 308, 309, 281–283, 166/259, 271; 175/69, 71; 252/8.55 C

[56] References Cited

U.S. PATENT DOCUMENTS

| | | | |
|---|---|---|---|
| 3,136,361 | 6/1964 | Marx | 166/308 |
| 3,330,346 | 7/1967 | Jacobs et al. | 166/273 |
| 3,530,940 | 9/1970 | Dauben | 166/309 X |
| 3,572,440 | 3/1971 | Hutchison et al. | 166/309 X |
| 3,937,283 | 2/1976 | Blauer et al. | 166/308 X |
| 3,980,136 | 9/1976 | Plummer et al. | 166/308 X |

*Primary Examiner*—Stephen J. Novosad

[57] ABSTRACT

Subterranean formations are fractured by means of an acid foam which can contain propping materials.

8 Claims, No Drawings

ACID FOAM FRACTURING

BACKGROUND OF THE INVENTION

This invention relates to the treatment of subterranean formations. More particularly, this invention relates the use of acid foam for fracturing of subterranean formations.

Various methods have been utilized by the oil industry for increasing the oil and gas flow from subterranean formations. One approach is to hydraulically fracture such formations with various liquids with or without propping agents suspended therein. The hydraulic pressure causes fracturing of the rock; the initially formed fractures are then extended by the injection of liquids under pressure therein. Thus, fracturing throughout these specifications shall mean initiating the fracture, propagating it or enlarging it. A propping agent, if one is used, is deposited in the fractures to maintain the permeability of the formation after liquids are removed.

An improvement of this approach is to inject an acid solution into the formation under sufficient pressure to cause a fracture. The acid contained in the solution etches the fracture walls, thereby providing highly conductive channels. The degree of stimulation of the flow from the subterranean formation is strongly dependent upon the extend of acid penetration into the fracture; consequently, various methods have been devised to assure deep acid penetration. One such method involves the use of emulsions to shield the acid from the formation materials and thereby allow unreacted acid to penetrate deeply into the formation. Other methods to increase acid penetration involve the use of gelled acids and acids containing inhibitors which retard the reaction with the walls of the formation.

The enumerated attempts for increasing the productivity of oil and gas flow from subterranean formations suffer from several drawbacks. Thus, conventional hydraulic fracturing requires high viscosity liquids requiring extremely large pumping equipment to achieve satisfactory injection rates. It often necessitates a chemical treatment to improve the viscosity, gel strength and fluid loss properties before such liquids can be used for fracturing. The removal of the viscous fracturing fluid from the resulting fractures presents additional problems. Other difficulties are the tendency for the sand or propping agent, often incorporated in the fracturing fluid, to plug the entry to the fracture and the failure of a viscous fracturing fluid to uniformly deposit the propping agent within the fracture.

The problems associated with the use of emulsions, retarded and gelled acids are the size and high horsepower requirement of the pumping equipment and the difficulty in removal of the injected liquid. The present invention provides an improved acid fracturing process that alleviates many of the difficulties associated with prior art techniques.

Thus, one object of the present invention is to increase the productivity of a formation carrying oil, gas or other products.

Another object of the invention is to provide an improved formation fracturing operation.

A further object of the invention is to provide a method for fracturing subterranean formation, which results in the creation of deep and wide fractures.

Another object of the invention is to combine foam and chemical fracturing of formations to optimize results.

A still further object of the invention is to reduce the energy required for injection and the size of pumping equipment.

Still another object of the invention is to reduce the time and effort required for removal of the fracturing fluid.

A still further object of the invention is to provide a fluid which readily penetrates the created fractures and the existing cracks in the formation and uniformly deposits the propping agent contained therein.

Still another object of the invention is to provide a fracturing fluid which moderates the rate of reaction between the formation minerals and the acid contained in the fluid foam until full penetration of the fracture is obtained.

A still further object of the invention is to minimize the damage to subterranean formations by liquid fracturing media.

Still another object of the invention is to decrease the amount of acid needed for fracturing of a formation.

A still further object of the invention is to enable fracturing of formations with acid-foam even at elevated temperatures such as 300° F (149° C) to 500° F (260° C).

Other objects and advantages of this invention will be apparent to one skilled in the art upon studying this disclosure.

SUMMARY OF THE INVENTION

In accordance with one aspect of the invention, the fracturing fluid is an acid-foam optionally containing a propping agent. The foam is placed in contact with the formation undergoing treatment or to be fractured and sufficient pressure is applied to the fluid to fracture the formation.

In accordance with another aspect of the invention, a fracturing fluid is a foam made from a gelled polymer solution containing acid or a gelled acid solution either of which may optionally contain a propping agent. This foam when placed in contact with the formation to be treated or fractured and pressure applied, fractures or enlarges fractures in the formation.

In accordance with still another aspect of the invention, the other ingredients of the foam partly shield the acid present therein from reacting with the side of the formation, thus allowing preponderance of acid to penetrate deeply into the formation, so that bulk of the reaction takes place in the optimum location upon collapsing the foam.

In accordance with a further aspect of the invention, nitrogen and other ingredients of foam absorb the heat of reaction between acid and the formation, thus limiting the reaction rate.

In accordance with a further aspect of the invention said foam will break upon reduction in pressure by expansion of the enclosed gases resulting in acid being available for etching the formation and for depositing the suspended propping agent (if any). Said pressure reduction causes the flow to reverse directions and liquids originally present as foam, as well as reaction products, flow back into the well bore where they can be effectively removed to leave a relatively dry fractured zone which is propped open and acid etched to provide minimum resistance to flow of the gas and/or oil to be produced.

In accordance with a still further object of the invention incorporating of a gelling agent into the foam enables the foam to remain thermally stable even when exposed to elevated temperatures such as 300° F (149° C) to 500° F (260° C).

Other aspects of this invention will become apparent to one skilled in the art upon studying this disclosure and the appended claims.

DETAILED DESCRIPTION OF THE INVENTION

A foam containing an acid of the type that readily reacts with the formation is used to fracture subterranean formations. The fracturing is accomplished by means of pressure under which it is injected and chemical reaction of the acid with the formation. Since only a small portion of the acid contained in the foam is at the foam's surface, the majority of the acid does not react with the formation immediately upon injection. Furthermore, most of the heat generated by the reaction is absorbed by the foam, thus reducing the temperature and limiting the reaction rate of the acid with minerals of the formation. As the result, substantially all the acid is carried deep into the fracture remaining available for reaction until the foam is broken.

The foam used is a dispersion of a gas in an acid solution containing a foaming agent. The volumetric gas content, or foam quality, can range from about 50 to about 95 percent at the temperature and pressure of injection, but the preferable range is between 65 and 85 percent by volume. Although any gas can be employed, it is preferable to use an inert easily available gas, such as nitrogen. Examples of other gases that can be utilized with the invention include: carbon dioxide, air, hydrocarbon gases, argon, helium, krypton and xenon.

The liquid may be water, light oil, or other carrier medium but it must be compatible with the acid and surfactant used. In the preferred embodiment, water is chosen because of its availability and compatibility with many commonly employed acids and surfactants.

Any foaming agent compatible with other ingredients of the foam and capable of producing foam in an acidic environment can be used in the invention. Many of the foaming agents disclosed in U.S. Pat. Nos. 3,269,468; 3,313,362; 3,136,361 and 3,572,440 meet both criteria; however, foaming agents which are preferred are:

1. Igepal DM 970, a trademark for a sulfonated fatty acid produced by General Aniline and Film Corporation,
2. Orvus K, a trademark for a sulfonated fatty acid produced by Proctor and Gamble Co.,
3. Cor 180, a trademark for a material produced by Chemical Oil Recovery Co., and
4. GAFAC, a trademark for a material produced by General Aniline and Film Corp.

The amount of the foaming agent depends on the type of the agent used, the other ingredients in the foam and the required foam stability at the injection conditions. Generally the more surfactant is added the more stable is the foam. In the preferred embodiment 0.5 to 3 weight percent of surfactant is added to the liquid. Alternatively, instead of adding more surfactant, to form a foam of high stability, the solution can be gelled by a suitable gelling agent prior to incorporation of the surfactant in accordance with a method described in U.S. Pat. No. 3,727,688 for example. Especially useful for increasing thermal stability is the addition of sodium carboxymethylcellulose polymer, polyacrylamides or polysaccharides; a foam gelled with sodium carboxymethylcellulose remains stable even at elevated temperatures such as 300° F (149°) to 500° F (260° C). The concentration of the gelling agent in the solution from which foam is made, can be from about 250 to about 15,000 ppm. In most applications, a concentration between about 350 and about 10,000 ppm is preferred.

Although any acid, or a mixture of acids, which is capable of reacting with the minerals of the formation and which is compatible with the other ingredients may be used, the preferred acids include mineral acids such as hydrochloric, hydrofluoric, phosphoric, sulfuric, sulfamic, and nitric acids. Other acids suitable for the use with this invention can be selected from those disclosed in U.S. Pat. No. 3,572,440. It should be emphasized that the selection of an acid depends on its ability to react with the formation. The concentration of the acid in the liquid component depends on the particular acid or acids used, the desired pH and the desired foam stability. Generally 5 to 50 weight percent by weight acid solution provides a satisfactory foam for most applications.

Optionally, a propping agent may be added to the foam at any stage of operation before the foam is injected into the formation. The propping agent is carried into fractures in the formation and becomes wedged there upon collapse of the foam, hence, it keeps open passages through the formation thus allowing increased flow of oil and gas therefrom. Many particulate materials may be employed as propping agents, it is preferred, however, in most applications to use sand. Especially useful is smooth round grain sand whose size is between 10 and 80 mesh. The amount of sand that can be carried in the foam varies with the type of acid foam used, but commonly 0.2 to 3 pounds of sand per gallon of acid foam is used.

In operation, the acid, liquid and surfactant can be mixed together in any desired order. It is preferred, however, to add an acid to water and then add a surfactant. Optionally where thermal stability of foam is desired, sodium carboxymethylcellulose polymer can be added in such concentration as to gell the liquid prior to addition of the surfactant. Agitation, helpful in making the solution homogenous, can be provided by means of a static mixer in addition to pump and pipe mixing. The solution is aerated with the gas to form a foam of desired quality. A propping agent, if it is used, can be added either to the solution, or it can be incorporated into foam as the foam is being pumped into the formation.

The foam is then injected into the formation at a pressure required for fracturing which may be anywhere from 500 to 20,000 pounds per square inch and even more. Since acid is uniformly distributed throughout the foam, only the acid near or at the surface of the foam is available for reaction with the wall of the formation. The products of the reaction usually include a gas and water, the gas being a component of the original acid or a resultant gas, such as carbon dioxide, resulting from reaction with the formation material. The reaction is usually exothermic; consequently, the reaction is reduced further by absorbtion of heat by the foam and by the rapid flow of the fluid foam past the reaction site. As the foam penetrates into the fracture, it uses up only a minor amount of acid allowing the remaining part of the acid to penetrate deeply into the fracture.

The propping agent, if one is used, is transported in the foam into the cracks produced by fracturing and becomes wedged there. The foam is stable only for a certain period of time, which is dependent on the type, the amount of a surfactant agent and whether a gelling agent such as sodium carboxymethyl-cellulose was used. It is stable only under high pressure; consequently, it can be collapsed either by a lapse of time or by a sudden release of pressure. Upon collapsing of foam, the propping agent remains in the formation holding open the fracture and enabling oil and gas to pass therethrough. The acid reacts with the formation producing channels therein.

In the light of this disclosure many modifications, changes and substitutions will be apparent to those skilled in the art. It is intended that those modifications, changes and substitutions which fall within the spirit or scope of the invention be considered as a part thereof.

The following examples are included for illustrative purposes and are not intended to limit the scope of the invention:

EXAMPLE I

A solution contaning 12½ percent by weight of HCl in water was prepared and placed in eleven 100 ml samples. To each sample, varying amounts of a surfactant were introduced.

One sample was prepared using only tap water and a surfactant.

Within 24 hours all samples were converted into foam by aeration with nitrogen. The foam was placed in Ross-Miles apparatus and its heights were measured. The measurements were repeated after five minutes. The results appear in Table I.

Table I

| Results of Foaminess Tests on Surfactant Solutions: Ross-Miles Apparatus; 100 ml Solutions | | |
|---|---|---|
| Amount and type of a | Foam Collar Height, cm | |
| Surfactant added to acid solution | 0 Minutes | Five Minutes |
| 0.5% Igepal DM 970 | 6.0 | 4.5 |
| 1.5%    " | 6.0 | 5.0 |
| 3.0%    " | 5.8 | 4.5 |
| 0.5% Orvus K | 3.0 | 2.7 |
| 1.5%    " | 5.0 | 4.0 |
| 3.0%    " | 6.0 | 5.0 |
| 0.5% Cor 180 | 2.5 | 2.2 |
| 1.5%    " | 3.5 | 2.7 |
| 3.0%    " | 3.0 | 2.5 |
| 3.0% GAFAC LO 529 | 5.0 | 3.0 |
| Amount and type of a Surfactant added to water | | |
| 3.0% Igepal DM 970 | 6.2 | 5.2 |

The results indicate that stable foams can be obtained using acidic liquids. The foam stability is dependent on both the type and the amount of the surfactant used. With a proper choice of these variables (1.5% Igepal DM 970 and 3% Orvus K in Example I) foam in the acidic environment can be as stable as the one in the neutral environment.

EXAMPLE II

A 12.5 percent by weight HCl solution was prepared. To the solution, Orvus K liquid surfactant was added until the concentration of Orvus K liquid reached 3 percent by weight. The solution was subdivided into two samples. The first sample was aerated with nitrogen until foam was formed. A chip of carbonate salt was immersed in each of the samples. Before the run was concluded, the chip in the foam accidently dislodged and dropped into the unfoamed liquid. The chips were removed and their weights were compared to the original weights. The chip in the foam lost 28 percent of its original weight, whereas the chip immersed in the unfoamed liquid lost 39 percent of its original weight.

The result indicates that the foam shields some of the acid preventing its reaction with the carbonate rock. The difference in the loss of weight may have been even larger had the chip in the foam not fallen into the unfoamed liquid.

EXAMPLE III

The solution containing Cor 180 surfactant was placed in a glass lined pressure vessel equipped with a 3,000 psi pressure gauge and a 1,300 psi rupture disc. The vessel was sealed and then heated to 325° F (163° C) in a laboratory oven. The temperature of the test solution was monitored continuously with an iron-constantan thermocouple sealed into the vessel. The resistance factor was determined at intervals shown in Table II in accordance with the following procedure.

A 1-inch I.D. schedule 40 steel pipe 1-foot long was threaded at the ends and mounted in a vertical position. The tube was equipped with stainless steel sand retaining screens, filled with Ottawa Sand and capped with steel reducing couplings having needle valves. The tube was filled with water, and nitrogen from a 100 psi source introduced into the top. Water was then displaced out the bottom by nitrogen flow and the pressure drop across the sand pack during water displacement by the gas flood was measured with a capacitance-type transducer (Dynasciences Corporation, KP 15 and Model D 25 translator) and recorded on a strip chart recorder (Sargent model SR).

Surfactant solutions (normally three pore volumes) were introduced into the top of the tube with a hypodermic syringe, displacing water out the bottom. The surfactant solution was pushed through the sand pack with nitrogen causing foam to be generated in situ, and the pressure drop across the sand pack was measured in the same manner as described above for the gas-water flood. The ratio of the maximum differential pressure observed during the foam flood divided by the maximum pressure during the gas-water flood provided a qualitative measure of foam quality.

This product was repeated under the same conditions except the Cor 180 was added to solution gelled by sodium carboxymethylcellulose (CMC). The results of the runs appear in Table II.

Table II

| Thermal Stability of Surfactant Solutions | | |
|---|---|---|
| | RESISTANCE FACTOR* | |
| Hours at 325° F | 3% Solutions of Cor 180 | 3% Cor 180 added to Gelled (CMC) Solutions |
| 4.8 | 4.9 | 7.7 |
| 4.9 | 9.3 | ** |
| 7.8 | — | 6.5 |
| 8.8 | — | 7.7 |
| 9.0 | 1.2 | 5.7 |

*The resistance factor for a surfactant solution is defined as the ratio of the maximum pressure drop observed across the sand pack when the pore space was filled with the surfactant foam to the maximum pressure drop when the pack was filled with water and gas and was being displaced by nitrogen.
**Remained gelled.

This example indicates that gelled CMC polymer increases the thermal stability of the foamed solution.

I claim:

1. A method for fracturing subterranean formations comprising the steps of:
   a. forming a gelled acid-liquid solution by combining an acid chemically reactive with a subterranean formation with about 250 to about 15,000 ppm of a gelling agent selected from carboxymethylcellulose polymers, polyacrylamides, and polysaccharides, b. adding a sufficient amount of a surfactant to said gelled acid-liquid solution obtained in (a) to form a stable foam at formation injection conditions, said surfactant being compatible with the other ingredients of the gelled acid-liquid solution and capable of producing foam in an acidic environment, c. introducing said gelled acid-liquid solution containing surfactant and an inert gas into a subterranean formation under sufficient pressure to form a foam and cause fracturing of said subterranean formation, and d. allowing the acid contained in said foam to react with the subterranean formation and cause etching thereof.

2. A method according to claim 1 further comprising the step of incorporating a propping agent uniformly throughout said gelled acid-liquid solution of (b).

3. A method according to claim 2 wherein
said acid is selected from the group consisting of mineral acids and water soluble organic acids;
said surfactant is an anionic foaming agent; and said propping agent is sand.

4. A method according to claim 1
said acid is selected from the group consisting of hydrochloric, hydrofluoric, phosphoric, sulfuric, sufamic and nitric acid;
said liquid is water;
said surfactant is selected from the group consisting of Igepal DM 970, Orvus K, Cor 180 and GAFAC; and
said gas is selected from the group consisting of nitrogen, carbon dioxide, air, hydrocarbon gases, argon, helium, krypton and xenon.

5. A method according to claim 1 wherein said gelling agent is sodium carboxymethylcellulose and the concentration of sodium carboxymethylcellulose is in the range between about 350 ppm and about 10,000 ppm.

6. A method according to claim 1 wherein
said acid is hydrochloric acid comprising from about 5 to about 50 percent by weight of the solution;
said surfactant is selected from the group consisting of Igepal DM 970, Orvus K, Cor 180 and GAFAC and constitutes 0.5 to about 3 percent of the weight of the solution formed in step (b);
said gas is nitrogen;
said liquid is water; and
said foam contains between 50 and 95 percent nitrogen by volume.

7. A method according to claim 6 wherein
said surfactant is Igepal DM 970 and it constitutes 1.5% of the weight of the solution formed in step (b).

8. A method according to claim 6 wherein
said surfactant is Orvus K and it constitutes 3 percent of the weight of the solution formed in step (b).

* * * * *